United States Patent [19]

Vargiu et al.

[11] 4,105,604
[45] Aug. 8, 1978

[54] MOULDING COMPOSITIONS CONTAINING A NOVOLAK PHENOLIC RESIN AND AN AMINE-BORIC ACID STABILIZER-CATALYST

[75] Inventors: Silvio Vargiu, Casatenovo (Como); Pier Luigi Manzoni, Codogno (Milan); Mario Bernasconi, Maleo (Milan); Antonio Parodi, Monza (Milan), all of Italy

[73] Assignee: Societa' Italiana Resine S.I.R. S.p.A., Milan, Italy

[21] Appl. No.: 750,933

[22] Filed: Dec. 15, 1976

[30] Foreign Application Priority Data

Dec. 19, 1975 [IT] Italy ............................... 30494 A/75

[51] Int. Cl.² .................................................. C08L 1/02
[52] U.S. Cl. ....................................... 260/17.2; 260/38; 528/132
[58] Field of Search .................. 260/17.2, 57 A, 59 R

[56] References Cited

U.S. PATENT DOCUMENTS

| Re. 29,242 | 5/1977 | Schmoll | 260/59 R |
|---|---|---|---|
| 2,319,182 | 5/1943 | Van der Pyl | 260/17.2 |
| 2,326,727 | 8/1943 | Schroy | 260/59 |
| 2,606,888 | 8/1952 | Williams et al. | 260/17.2 |
| 2,606,889 | 8/1952 | Ward et al. | 260/59 |
| 2,956,033 | 10/1960 | Apel et al. | 260/17.2 |
| 3,200,172 | 8/1965 | Renner | 260/57 A |
| 3,326,843 | 6/1967 | Barnett et al. | 260/38 |
| 3,471,443 | 10/1969 | Bornstein | 260/59 |
| 3,476,706 | 11/1969 | Bornstein | 260/17.2 |

Primary Examiner—Edward M. Woodberry
Attorney, Agent, or Firm—Sughrue, Rothwell, Mion, Zinn and MacPeak

[57] ABSTRACT

A thermosetting molding composition comprising from 15 to 50 wt.% of Novolak phenolic resin; from 3 to 10 wt.% of hexamine; from 1 to 4 wt.% of a stabilizing-catalyzing mixture consisting of an amine chosen from polyamino aliphatic compounds and mono or polyamino aromatic compounds, and orthoboric or metaboric acid, wherein the ratio between said amino groups and the number of acid equivalents in said mixture is from 0.001:1 to 0.3:1; from 0.5 to 2 wt.% of alkaline earth metal oxide; and one or more inert fillers. This composition is particularly suitable for the production of molded articles by injection molding.

25 Claims, 1 Drawing Figure

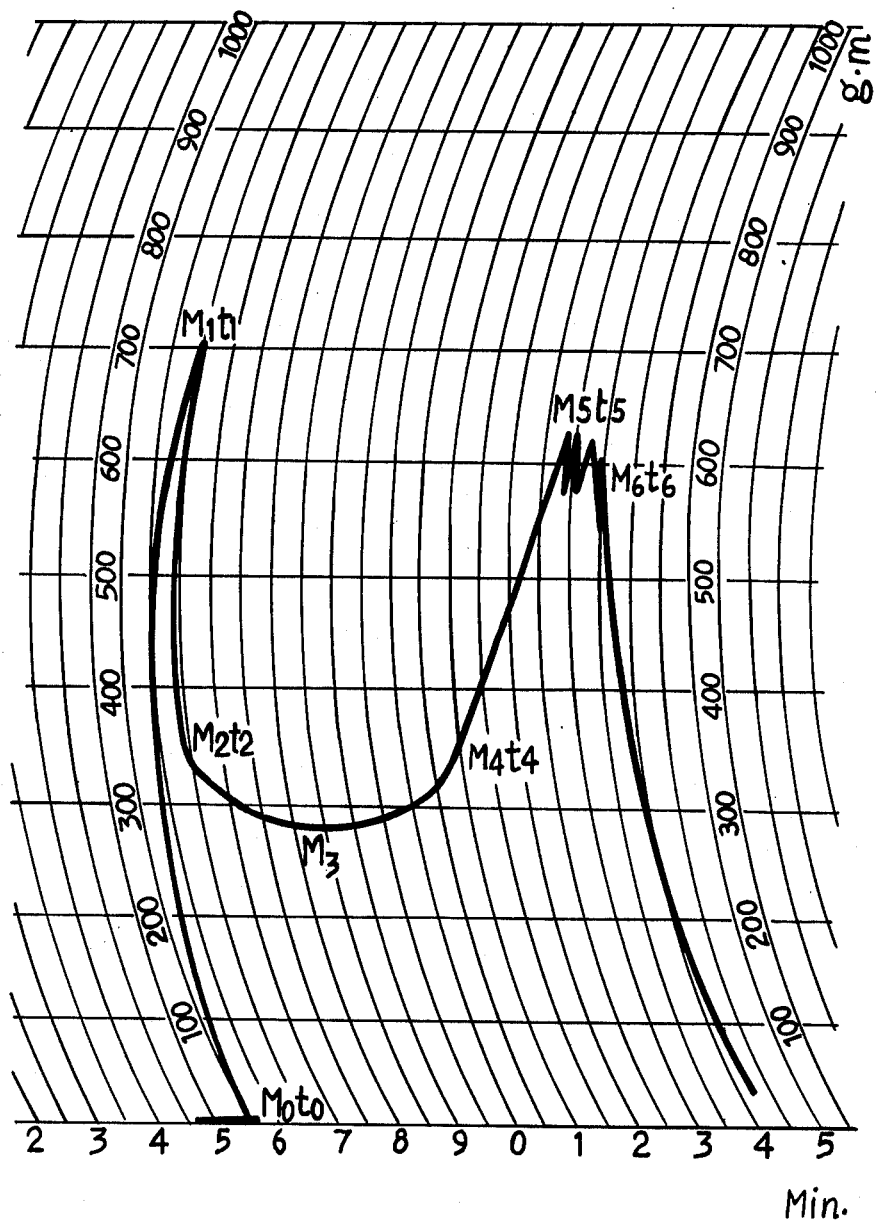

MOULDING COMPOSITIONS CONTAINING A NOVOLAK PHENOLIC RESIN AND AN AMINE-BORIC ACID STABILIZER-CATALYST

The present invention relates to a new moulding composition containing a Novolak phenolic resin, which hardens when heated and can be formed into moulded articles by injection moulding.

In particular, the invention concerns a moulding composition with improved flowability and thermal stability in the fluid state, and able to harden quickly and completely at a temperature higher than those needed to ensure fluidity of the said composition.

Moulding compositions containing a Novolak phenolic resin consisting of a condensation product of phenol with formaldehyde which hardens under heat in the presence of substances such as hexamine (hexamethylene tetramine), are known in the art.

The fundamental properties of these compositions are their ability to change into a fluid state on heating and then to harden irreversibly at higher temperatures.

As is known in the art, manufactured articles can be prepared from resin compositions by injection moulding, in apparatus in which the compositions are first heated uniformly until they become fluid and then injected into a mould where hardening takes place at temperatures higher than those ensuring fluidity.

This technique is applicable to those moulding compositions which have a sufficiently long working life in their fluid state, and which harden almost completely at a higher temperature.

As a general rule, compositions which include a Novolak phenolic resin cannot be moulded by injection moulding, particularly in view of their low thermal stability in the fluid state.

In order to reduce phenomenae of premature cross-linking and hardening, small amounts of oxides or acids of boron, such as for example boric anhydride, orthoboric and metaboric acids, or possibly combinations of said acids or oxides with hexamine, such as hexamine metaborate, are added in the art to the moulding compositions based on a Novolak phenolic resin.

This addition does not permit entirely satisfactory results to be obtained, since the compositions, while possessing improved thermal stability in the fluid state, still have undesirably long hardening times. As a result, the moulded articles are sometimes incompletely hardened, and have then poor mechanical properties.

Moreover, long hardening times are particularly disadvantageous, since they involve long moulding cycles with consequent decrease in productivity.

Another drawback is the high viscosity of compositions based on Novolak phenolic resins and hence their low flowability in the fluid state. This is an obstacle to the correct performance of the injection moulding.

It has now been found that these drawbacks can be eliminated, or at least greatly reduced, by means of the Novolak resin moulding composition of the present invention possessing the following properties:
— an ability to change into the fluid state within a range of temperatures in which premature cross-linking and hardening do not occur appreciably.
— a long working life in the fluid state;
— greater flowability in the fluid state;
— an ability to harden quickly and completely at temperatures higher than those needed to render the composition fluid.

Thus, the invention provides a thermosetting molding composition comprising:
(a) from 15 to 50 wt.% of Novolak phenolic resin;
(b) from 3 to 10 wt.% of hexamine;
(c) from 1 to 4 wt.% of a stabilizing-catalyzing mixture consisting of an amine chosen from aliphatic compounds having two or more amino groups, aromatic compounds having one amino group linked to an aromatic ring and aromatic compounds having two or more amino groups linked to one or more aromatic rings, and orthoboric or metaboric acid, wherein the ratio between said amino groups and the number of acid equivalents in said mixture is from 0.001 : 1 to 0.3 : 1;
(d) from 0.5 to 2 wt.% of alkaline earth metal oxide; and
(e) one or more inert fillers.

The composition may also contain small amounts of conventional additives, such as lubricants, dyes and pigments.

The Novolak phenolic resins are usually obtained by condensing formaldehyde with phenol in a molar ratio of less than 1 and generally from 0.8:1 to 0.98:1, in the presence of mineral or organic acids.

Preferably, the moulding composition contains from 20 to 45% by weight of Novolak phenolic resin and from 6 to 9% by weight of hexamine.

The basic characteristic of the composition of the present invention lies in the stabilizing-catalyzing system consisting of the aforesaid amine, and orthoboric or metaboric acid.

The presence of such a system in the composition results on the one hand in a greater thermal stability in the fluid state, and on the other hand in an acceleration of the hardening at temperatures higher than those needed for fluidity.

The composition of the present invention typically becomes fluid at a temperature of from 90° to 130° C and within this temperature range premature hardening and cross-linking do not occur appreciably.

Given the longer working life, or "plastic life", of this composition, and also its low viscosity and hence higher flowability in the fluid state, it is particularly suited for moulding by the injection method.

The stabilizing-catalyzing system also permits rapid hardening of the composition, and thus a higher productivity of the articles moulded by injection. Typically the composition hardness completely at a temperature of the order of 160°–170° C and in a time of about 30–45 seconds.

As previously stated, the constituents of the stabilizing-catalyzing system are an aromatic monoamino compound or an aromatic or aliphatic polyamino compound, and metaboric or orthoboric acid. The aromatic monoamines useful for this purpose contain an amino group ($NH_2$) linked to the aromatic ring. The preferred aromatic monoamines are aniline and substituted aminobenzenes, such as toluidine.

The aromatic polyamino compounds, useful for this purpose contain two or more amino groups linked to the same aromatic ring or to different aromatic rings. The preferred aromatic polyamino compounds are methylenedianilines, such as 4,4'-methylenedianiline and phenylenediamines such as para-phenylenediamine, or else methylenedianilines and phenylenediamines substituted in the aromatic rings.

The aliphatic polyamino compounds useful for this purpose contain two or more amino groups and are preferably chosen from diethylenetriamine, triethylenetetramine, tetraethylenepentamine, and ethylenediamine.

It is fundamental to the purposes of the present invention to maintain in the stabilizing-catalyzing system the ratio between the amino groups and the number of acid equivalents of orthoboric or metaboric acid at a value of from 0.01:1 to 0.3:1. Beyond this range undesirable results are obtained with respect to one or more of the following properties: thermal stability in the fluid state, flowability in the fluid state, and rate of hardening. The best results are obtained by keeping said ratio at a value of from 0.04:1 to 0.2:1.

The composition preferably contains from 1.5 to 3% by weight of stabilizing-catalyzing system.

The oxides of the alkaline earth metals are generally chosen from those of calcium and magnesium and are preferably present in the composition in an amount of from 1 to 1.5% by weight.

The inert fillers may be of an organic or mineral nature, such as for example wood flour, cellulose, organic fibres and fabrics, paper fibres, asbestos, mica, fluorite, talc, diatomaceous earth and rock flour.

The composition generally contains from 0.5 to 3% by weight of lubricant, chosen generally from waxes, stearic acid or its esters and stearates of zinc, calcium and magnesium.

Other additives generally present in the composition are dyes and pigments.

The preparation of the moulding composition may be carried out according to known methods, by mixing and homogenizing the constituents, calendering the homogenized mixture, crushing the resulting sheet, and recovering the granules of the desired size by sifting.

In the following experimental examples, the moulding compositions are prepared as follows.

The Novolak phenolic resin used is obtained by condensing formaldehyde and phenol in a 0.91:1 molar ratio, in an aqueous medium and in the presence of oxalic acid as catalyst. This resin has the following properties:

— viscosity at 25° C in ethanol in a 1:1 weight ratio: 60 cps
— melting point (capillary): 69° C The resin and all the other constituents of the composition are loaded into a mixer. The mixture is homogenized for 30 minutes at room temperature (20°-25° C) and then calendered under the following conditions: temperature of first roller 85° C, temperature of second roller 140° C, time 120 seconds. Thus, a sheet 2 mm. thick is obtained which is ground in a hammer mill and the ground mixture is sieved to separate the granules with dimensions of 2000 to 100 microns.

The composition obtained is tested by means of a Brabender rheometer from Brabender Instruments Inc.

The said rheometer comprises a cell with rotors able to rotate at different speeds. The whole system is thermostatically kept at a predetermined temperature. The composition under examination is placed in the cell. Under the action of the temperature and the friction of the rotors the composition undergoes physical and chemical changes.

The resistance exerted by the material against the rotary action, expressed as a torque in g.meters, is measured and recorded as a function of time.

A typical torque-time curve is shown in the accompanying diagram where the time ($t$) is shown in minutes on the abscissa and the torque (M) in gram meters on the ordinate.

More particularly, referring to the accompanying diagram, the variations are as follows:

$M_0-M_1$. After placing the composition in the cell, the torque changes from $M_0$ to $M_1$ in a time of $t_1 - t_0$.

$M_1-M_2$. There is a rapid drop in the torque since the composition begins to melt due to the effect of the heat transmitted from the thermostat system and that developed by the friction exerted on the composition by the rotors.

$M_2-M_3$. The composition become more and more fluid. The torque drops gradually to a minimum value corresponding to the maximum fluidity of the composition; therefore, the time $t_3 - t_1$ is that required for reaching the maximum fluidity and $M_3$ is the torque corresponding to the minimum viscosity of the fluid composition.

$M_3-M_4$. There is a gradual rise in the torque and also in the temperature of the composition, mainly because of the effect of heat transmitted from outside; the time $t_4-t_2$ represents the "plastic life" or useful working time of the composition before hardening.

$M_4-M_5$. There is a rapid rise in the torque due to the hardening of the composition; at $M_5$ the hardening is complete and the time $t_5-t_4$ represents the hardening time.

$M_5-M_6$. The hardened composition crumbles in the time $t_6-t_5$.

When the hardened composition has crumbled, the torque falls rapidly.

This test shows whether the composition under examination is suitable for injection moulding and, if so, the operation parameters to be selected in said injection moulding.

The compositions used in the Examples have been tested in a Brabender rheometer equipped with a cell for thermosetting compositions with a 25 ml capacity. Into the cell are loaded 20 grams of the composition under examination in a loading time of 20 seconds. A weight of 10kg. is applied and the rotor speed is 20 r.p.m.

The most significant results are reported in the Examples, namely:

$M_3$ — the minimum torque, linked to the fluidity of the composition.

$t_4-t_2$ — plastic life expressed in seconds $t_2$ and $t_4$ correspond to a M value 300 gram meters above the minimum value $M_3$.

$t_5-t_3$ — hardening time, in seconds.

EXAMPLES 1-4

In the compositions of Examples 1 to 4, the amount of orthoboric acid (1.5%) is kept constant, while the amount of aniline is reduced (from 1% to zero).

Table 1 shows the constituents of the compositions and their contents in parts by weight. Example 4 is for comparison.

Table 1

|  | Ex.1. | Ex.2. | Ex.3 | Ex.4. |
|---|---|---|---|---|
| Phenolic resin | 40.0 | 40.0 | 40.0 | 40.0 |
| Hexamine | 6.8 | 6.8 | 6.8 | 6.8 |
| Magnesia | 1.0 | 1.0 | 1.0 | 1.0 |
| Lime | 0.5 | 0.5 | 0.5 | 0.5 |
| Stearin | 1.0 | 1.0 | 1.0 | 1.0 |
| Zinc stearate | 1.5 | 1.5 | 1.5 | 1.5 |
| Induline | 1.8 | 1.8 | 1.8 | 1.8 |
| Diatomaceous earth | 6.0 | 6.0 | 6.0 | 6.0 |
| Talc | 6.0 | 6.0 | 6.0 | 6.0 |
| Wood flour | 32.7 | 33.2 | 33.5 | 33.9 |

Table 1-continued

|  | Ex.1. | Ex.2. | Ex.3 | Ex.4 |
|---|---|---|---|---|
| Aniline | 1.0 | 0.5 | 0.2 | — |
| Orthoboric acid | 1.5 | 1.5 | 1.5 | 1.5 |

The compositions of Examples 1 to 4 are tested by means of the Brabender rheometer as described previously. Table 2 shows the results of these tests carried out at 130° and 160° C.

The data of Table 2 shows that the addition of aniline permits a reduction of the hardening time, high values of the fluidity of the composition being maintained.

Table 2

|  | Ex.1 | Ex.2 | Ex.3 | Ex.4 |
|---|---|---|---|---|
| $M_3$ (130°) | 300 | 300 | 250 | 250 |
| $t_4-t_2$ (130°) | 140 | 170 | 200 | 240 |
| $M_3$ (160°) | 200 | 180 | 150 | 180 |
| $t_4-t_2$ (160°) | 60 | 70 | 75 | 95 |
| $t_5-t_3$ (160°) | 65 | 75 | 80 | 90 |

EXAMPLES 5-7

In Examples 5 to 7 the content of aniline is kept constant (0.5%), while the content of orthoboric acid is reduced from 1.5% to 0.5%.

Table 3 shows the constituents of the compositions and their contents in parts by weight.

Table 3

|  | Ex.5 | Ex.6 | Ex.7 |
|---|---|---|---|
| Phenolic resin | 40.0 | 40.0 | 40.0 |
| Hexamine | 6.8 | 6.8 | 6.8 |
| Magnesia | 1.0 | 1.0 | 1.0 |
| Lime | 0.5 | 0.5 | 0.5 |
| Stearin | 1.0 | 1.0 | 1.0 |
| Zinc stearate | 1.5 | 1.5 | 1.5 |
| Induline | 1.8 | 1.8 | 1.8 |
| Diatomaceous earth | 6.0 | 6.0 | 6.0 |
| Talc | 6.0 | 6.0 | 6.0 |
| Wood flour | 33.2 | 33.7 | 34.2 |
| Aniline | 0.5 | 0.5 | 0.5 |
| Orthoboric acid | 1.5 | 1.0 | 0.5 |

Table 4 shows the results of the tests carried out with the Brabender rheometer on the compositions of Examples 5 to 7.

Table 4

|  | Ex.5 | Ex.6 | Ex.7 |
|---|---|---|---|
| $M_3$ (130°) | 300 | 400 | 500 |
| $t_4-t_2$ (130°) | 170 | 170 | 130 |
| $M_3$ (160°) | 180 | 300 | 400 |
| $t_4-t_2$ (160°) | 70 | 60 | 60 |
| $t_5-t_3$ (160°) | 75 | 85 | 75 |

The data in Table 4 show the improvements in the fluidity of the composition when the content of orthoboric acid is increased or, in other words, when the ratio of the aniline to the orthoboric acid is decreased.

EXAMPLES 9-11

In Examples 9 to 11, the content of orthoboric acid is kept constant (1.5%), while the content of 4,4'-methylenedianiline (PMDA) is reduced (from 1% to 0.2%).

Table 5 shows the constituents of the compositions and their contents in parts by weight.

Table 6 shows the results of the tests carried out with the Brabender rheometer on the compositions of Examples 9 to 11.

The data given in Table 6 shows that the hardening time is reduced in proportion as the ratio of the paramethylenedianiline to the orthoboric acid is increased.

Table 5

|  | Ex. 9 | Ex. 10 | Ex. 11 |
|---|---|---|---|
| Phenolic resin | 40.0 | 40.0 | 40.0 |
| Hexamine | 6.8 | 6.8 | 6.8 |
| Magnesia | 1.0 | 1.0 | 1.0 |
| Lime | 0.5 | 0.5 | 0.5 |
| Stearin | 1.0 | 1.0 | 1.0 |
| Zinc stearate | 1.5 | 1.5 | 1.5 |
| Induline | 1.8 | 1.8 | 1.8 |
| Diatomaceous earth | 6.0 | 6.0 | 6.0 |
| Talc | 6.0 | 6.0 | 6.0 |
| Wood flour | 32.7 | 33.2 | 33.5 |
| PMDA | 1.0 | 0.5 | 0.2 |
| Orthoboric acid | 1.5 | 1.5 | 1.5 |

Table 6

|  | Ex.9 | Ex.10 | Ex.11 |
|---|---|---|---|
| $M_3$ (130°) | 300 | 300 | 300 |
| $t_4-t_2$ (130°) | 140 | 180 | 180 |
| $M_3$ (160°) | 200 | 200 | 200 |
| $t_4-t_2$ (160°) | 50 | 80 | 80 |
| $t_5-t_3$ (160°) | 60 | 70 | 90 |

EXAMPLES 12-14

In Examples 12 to 14, the content of orthoboric acid is kept constant (1.5%), the content of triethylenetetramine (TETA) decreasing (from 1% to 0.2%).

Table 7 shows the constituents of the compositions and their contents in parts by weight.

Table 7

|  | Ex.12 | Ex.13 | Ex.14 |
|---|---|---|---|
| Phenolic resin | 40.0 | 40.0 | 40.0 |
| Hexamine | 6.8 | 6.8 | 6.8 |
| Magnesia | 1.0 | 1.0 | 1.0 |
| Lime | 0.5 | 0.5 | 0.5 |
| Stearin | 1.0 | 1.0 | 1.0 |
| Zinc stearate | 1.5 | 1.5 | 1.5 |
| Induline | 1.8 | 1.8 | 1.8 |
| Diatomaceous earth | 6.0 | 6.0 | 6.0 |
| Talc | 6.0 | 6.0 | 6.0 |
| Wood flour | 32.7 | 33.2 | 33.5 |
| TETA | 1.0 | 0.5 | 0.2 |
| Orthoboric acid | 1.5 | 1.5 | 1.5 |

Table 8 shows the results of the tests carried out with the Brabender rheometer on the compositions of Examples 12 to 14.

Table 8

|  | Ex. 12 | Ex. 13 | Ex. 14 |
|---|---|---|---|
| $M_3$ (130°) | 600 | 500 | 500 |
| $t_4-t_2$ (130°) | 180 | 210 | 230 |
| $M_3$ (160°) | 450 | 300 | 200 |
| $t_4-t_2$ (160°) | 65 | 70 | 80 |
| $t_5-t_3$ (160°) | 60 | 70 | 80 |

The data in Table 8 show that the addition of triethylenetetramine permits a reduction in hardening time, high values of the plastic life being maintained.

The corresponding decrease in fluidity of the composition comes within acceptable limits. The values of the plastic life are higher than those of compositions containing aromatic amines and the hardening times are similar to those of the said compositions.

What we claim is:

1. A thermosetting injection molding composition comprising:
   (a) from 15 to 50 wt.% of Novolak phenolic resin;
   (b) from 3 to 10 wt.% of hexamine;

(c) from 1 to 4 wt.% of a stabilizing-catalyzing mixture consisting of an amine selected from the group consisting of aliphatic compounds having two or more amino groups, aromatic compounds having one amino group linked to an aromatic ring and aromatic compounds having two or more amino groups linked to one or more aromatic rings, and orthoboric or metaboric acid, wherein the ratio between said amino groups and the number of acid equivalents in said mixture is from 0.001:1 to 0.3:1;

(d) from 0.5 to 2 wt.% of alkaline earth metal oxide; and (e) one or more inert fillers.

2. The composition of claim 1, wherein said Novolak phenolic resin is the condensation product of formaldehyde with phenol in a molar ratio of from 0.8:1 to 0.98:1, in the presence of a mineral or organic acid as catalyst.

3. The composition of claim 1, which contains from 20 to 45 wt.% of Novolak phenolic resin.

4. The composition of claim 1, which contains from 6 to 9 wt.% of hexamine.

5. The composition of claim 1, wherein said alkaline earth metal oxide is selected from the group consisting of calcium and magnesium oxide.

6. The composition of claim 1, wherein said alkaline earth metal oxide is present in an amount of from 1 to 1.5 wt.%.

7. The composition of claim 1, which contains from 1.5 to 3 wt.% of stabilizing-catalyzing mixture.

8. The composition of claim 1, wherein said ratio between the amino groups and the acid equivalents is from 0.04:1 to 0.2:1.

9. The composition of claim 1, wherein said inert fillers are selected from the group consisting of wood flour, cellulose, organic fibres and fabrics, paper fibres, asbestos, mica, fluorite, talc, diatomaceous earth and rock flour.

10. The composition of claim 1, which contains from 0.5 to 3 wt.% of a lubricant selected from the group consisting of waxes, stearic acid and its esters and zinc, calcium and magnesium stearates.

11. A thermosetting injection molding composition comprising:

(a) from 15 to 50 wt.% of Novolak phenolic resin;

(b) from 3 to 10 wt.% of hexamine;

(c) from 1 to 4 wt.% of a stabilizing-catalyzing mixture consisting of an amine selected from the group consisting of aniline, substituted aminobenzenes, methylenedianilines, phenylenediamines, methylenedianilines and phenylenediamines substituted in the aromatic rings, diethylenetriamine, triethylenetriamine, tetraethylenepentamine and ethylenediamine, and orthoboric or metaboric acid, wherein the ratio between the amino groups and the number of acid equivalents in said mixture is from 0.001:1 to 0.3:1;

(d) from 0.5 to 2 wt.% of alkaline earth metal oxide; and (e) one or more inert fillers.

12. The composition of claim 1 which is fluid at a temperature of from 90° to 130° C and which within this temperature range does not undergo substantial premature hardening and cross-linking.

13. The composition of claim 12 which hardens completely at a temperature on the order of 160°–170° C in a time of about 30–45 seconds.

14. The composition of claim 11 which is fluid at a temperature of from 90° to 130° C and which within this temperature range does not undergo substantial premature hardening and cross-linking.

15. The composition of claim 14 which hardens completely at a temperature on the order of 160°–170° C in a time of about 30–45 seconds.

16. The composition of claim 1 wherein said amine is an aliphatic compound having two or more amino groups.

17. The composition of claim 1 wherein said amine is an aromatic compound having one amino group linked to an aromatic ring.

18. The composition of claim 1 wherein said amine is an aromatic compound having two or more amino groups linked to one or more aromatic rings.

19. The composition of claim 11 wherein said amine is selected from said substituted aminobenzense.

20. The composition of claim 11 wherein said amine is selected from said methylenedianilines.

21. The composition of claim 11 wherein said amine is selected from said phenylenediamines.

22. The composition of claim 11 wherein said amine is said tetraethylenepentamine.

23. The composition of claim 11 wherein said amine is said ethylenediamine.

24. The composition of claim 1 consisting essentially of the recited components.

25. The composition of claim 11 consisting essentially of the recited components.

* * * * *